June 1, 1937. G. KNACKERT 2,082,065
COMPASS
Filed Nov. 7, 1934 3 Sheets-Sheet 1
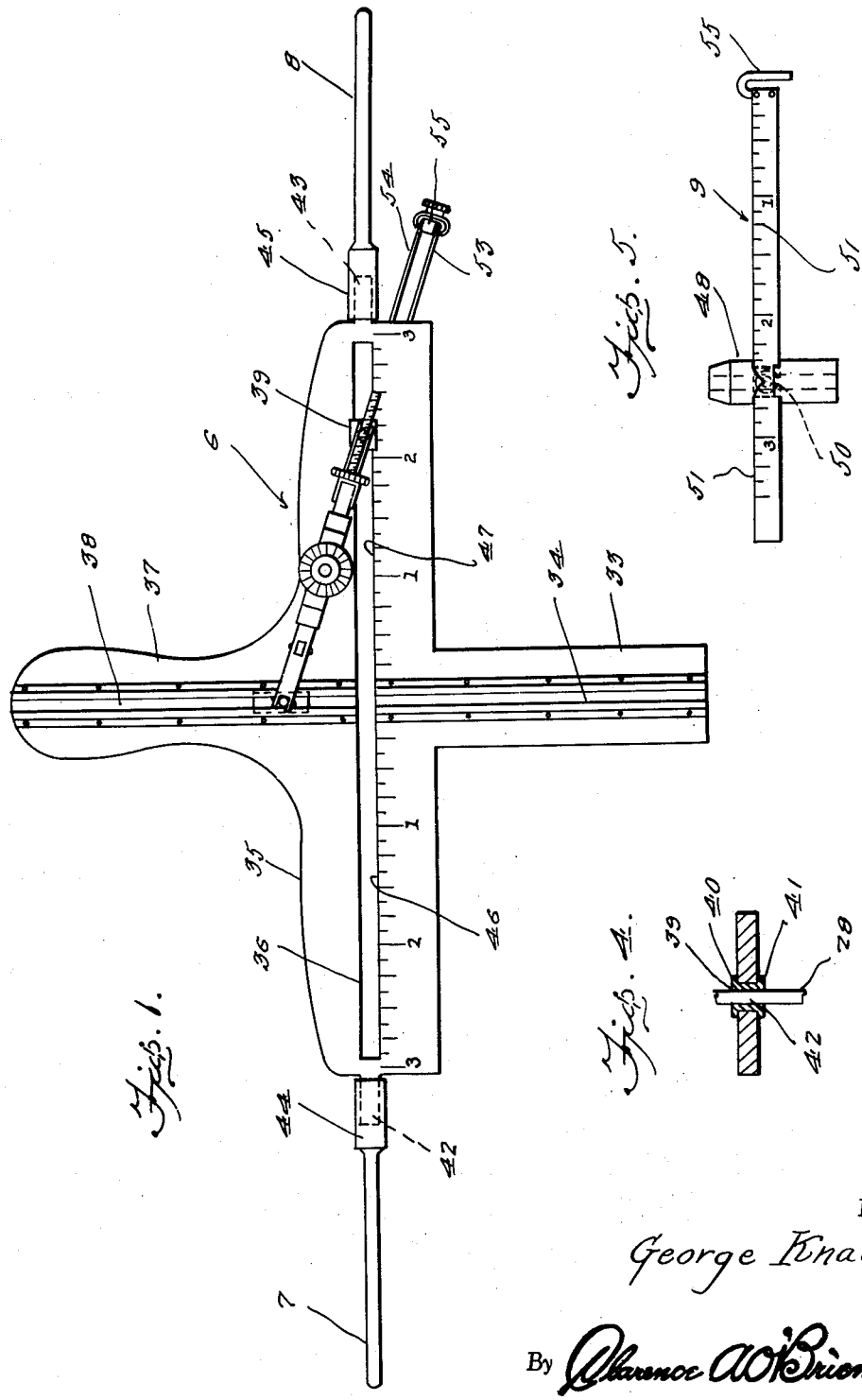
Inventor
George Knackert
By Clarence A. O'Brien
Attorney June 1, 1937.   G. KNACKERT   2,082,065
COMPASS
Filed Nov. 7, 1934   3 Sheets-Sheet 2
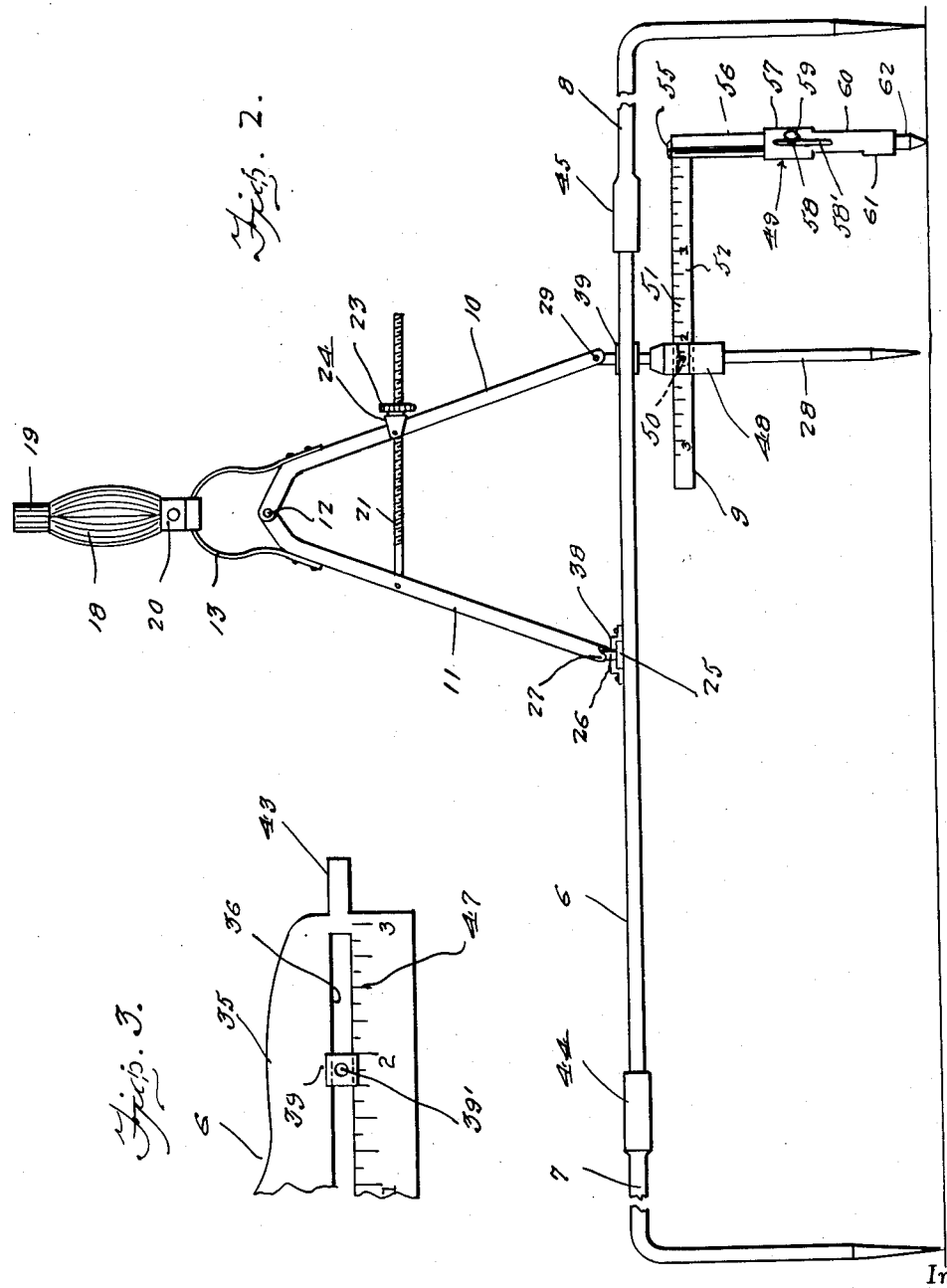
Inventor
George Knackert
By Clarence A. O'Brien
Attorney June 1, 1937. G. KNACKERT 2,082,065
COMPASS
Filed Nov. 7, 1934 3 Sheets-Sheet 3
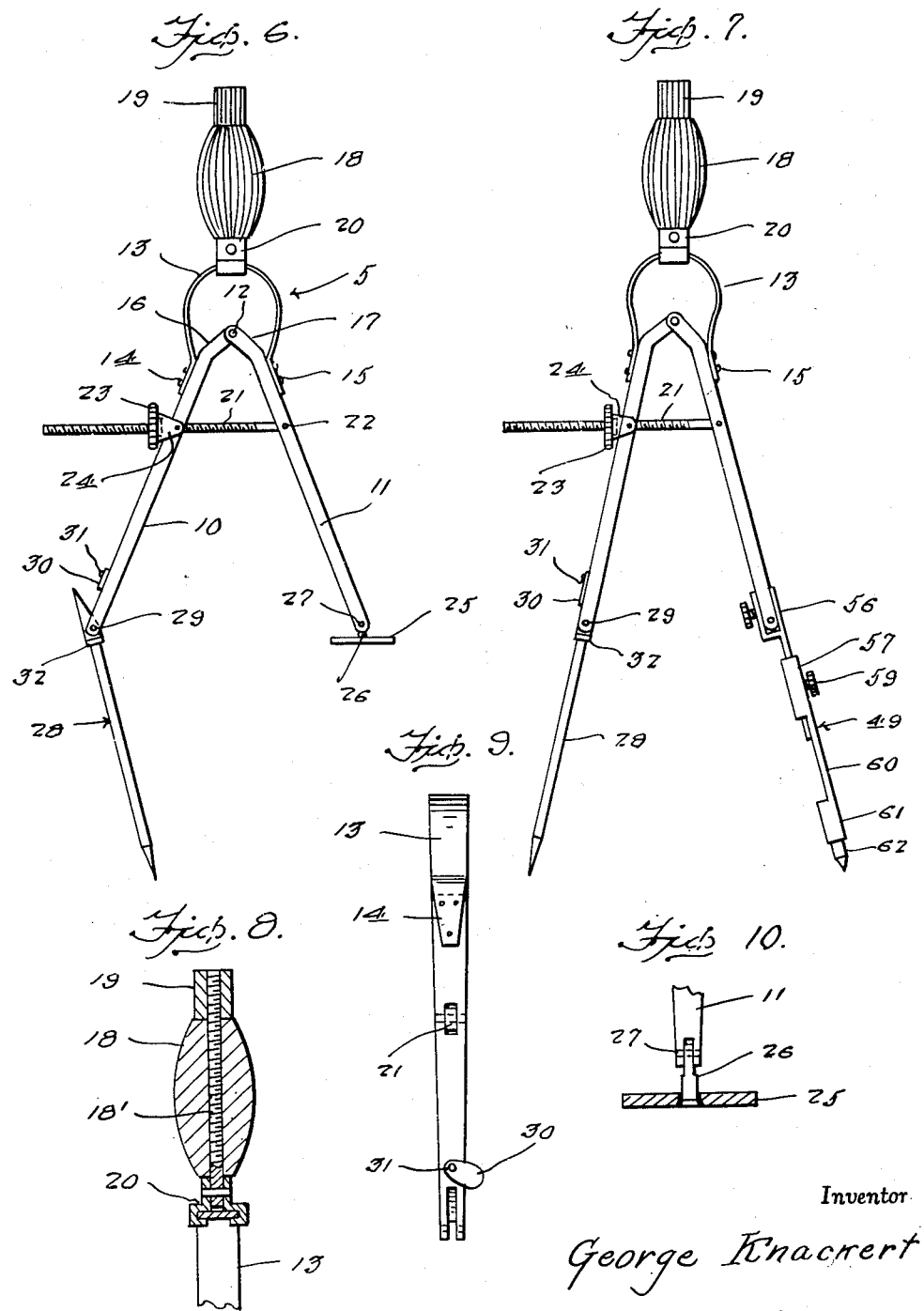
Inventor
George Knackert
By Clarence A. O'Brien
Attorney Patented June 1, 1937

2,082,065

UNITED STATES PATENT OFFICE 2,082,065

COMPASS

George Knackert, Sheboygan, Wis.

Application November 7, 1934, Serial No. 751,922

4 Claims. (Cl. 33—30)

My invention relates generally to drafting and plotting instruments, and particularly to an instrument of this character capable of describing circles and ellipses and other regular and irregular figures and curves, and an important object of my invention is to provide a combination instrument of the character indicated which is comparatively simple and inexpensive and is very easily operated and adjusted.

Another important object of my invention is to provide in an apparatus of the character indicated above, means for ensuring accuracy in the describing of the various figures and lines, whereby the draftsman may quickly and easily describe accurate figures and lines without being under the necessity to make complicated and time-consuming adjustments and calculations.

Other objects and advantages of my invention will be apparent from a reading of the following description in connection with the drawings, wherein for purposes of illustration I have shown a preferred embodiment of my invention.

In the drawings:—

Figure 1 is a top plan view of the embodiment.

Figure 2 is a side elevational view of the embodiment looking upwardly in Figure 1.

Figure 3 is a top plan view of a right hand portion of Figure 1 showing the cross-bar plate.

Figure 4 is a transverse vertical sectional view through Figure 3 showing the position of the die.

Figure 5 is a side elevational view of the extension bar.

Figure 6 is a side elevational view of the compass member of the organization shown in Figures 1 and 2.

Figure 7 is a view similar to Figure 6 but showing the compass member equipped with adjustable scriber for use apart from the organization shown in Figures 1 and 2.

Figure 8 is a transverse vertical sectional view through the upper part of the compass member.

Figure 9 is a side elevational view of the compass member.

Figure 10 is a transverse vertical sectional view through the lower part of the right hand leg of the compass member as shown in Figure 6.

The device of the invention consists of three principal parts, viz; (1) The compass 5, (2) The cross-bar plate 6 with anchor points 7 and 8 (3) The extension bar 9.

The compass consists of two legs 10 and 11, joined at one end by a pivot 12, with a sturdy flat semi-circular spring 13, having its ends fastened as indicated at 14, 15 near the pivoted ends of the legs. The upper ends of the pivoted legs are slightly bent inwardly above the attached ends of the spring as indicated at 16 and 17.

A knob 18 with a small head 19 is secured with clamps 20 to the exact center of the top of the curved spring 13. The small head 19 is used for leverage in describing an ordinary circle with the compass only. The larger knob 18 affords better leverage when manipulating the compass in connection with the cross-bar plate 6 in describing ellipses. Both the knob 18 and the head 19 have a burred surface to insure a better grip for the fingers of the draftsman.

At a point about one third down from its upper end the leg 11 has one end of a set screw 21 pivoted thereto as indicated at 22, whereby the set screw can be swung up and down in the plane in which the legs lie. The opposite end of the set screw 21 passes through a small oblong opening in the other leg 10, at a point thereon corresponding to the point of its pivotal attachment on the first leg. A burr 23 is threaded on the set screw outwardly of the leg 10. A locking device 24 which acts as a stop for the burr 23 has portions, hinged on the opposite sides of the leg 10 so as to swing while the compass is being set for any size circle or ellipse. The engagement of the burr with the device 24 is such that once the aperture of the legs has been set further opening or closing of the legs is positively prevented. The compass spring 13 and the lock 24 on the set screw 21 give the mechanism rigidity, which is essential for drawing accurate circles and especially ellipses.

The length of the legs below the set-screw 21 is about twice that above. The lower end of the leg 11 is bifurcated and has secured thereto a small flat oblong shoe 25 having slightly rounded corners, which may vary in size according to the size of the compass and the attachments. A tiny steel peg 26 having a reduced end with a shoulder is riveted in the center of the shoe 25, the riveted end of the peg being countersunk on the bottom of the shoe, and the shoulder resting on the top of the shoe and the shoe being rotatable on the peg as an axis. The upper tenoned end of the peg 26 is inserted snugly in the squarely bifurcated end of the leg 11, and secured therein by a pin 27 which traverses the furcations and the peg 26, whereby the shoe may be rotated on the axis of the peg and be swung also in the plane in which the compass legs lie.

The lower end of the compass leg 10 is also bifurcated or squarely notched to receive the upper end of a slender steel bar 28, which is pivotally secured by a pivot 29 traversing it and the furcations of the notch, so as to be capable of being swung only in the same plane as the steel peg 26 on the leg 11. The upper end of this slender bar 28 is extended somewhat above the pivot 29, and is tapered on its inner side to a point, and this taper fits exactly into a correspondingly shaped extension of the notch at the outer side of the lower end of the leg 10. A latch plate 30 is pivoted as indicated at 31 to the outer side of the leg 10 at a point just above the end of the extended portion of the notch, and is arranged to be swung downwardly to engage the outer side of the upper end of the slender bar 28 whereby the bar 28 is locked in extension of the leg 10 as shown in Figure 7. The latch plate 30 is turned to one side as shown in Figure 6 while the compass is being used in describing any ellipses. The lower end of the slender bar 28 is pointed to serve as an anchor in centering and describing any desired circle. The slender steel bar 28 is prefectly round below its pivotal point and has near its upper end a lateral flange 32 close to the end of the compass-leg which is arranged to rest on the rim of a hole in the die, to be described below. The bar 28 perfectly round below the flange 32 for a length corresponding to the depth of the hole in the die, which may be from one sixteenth to one eighth of an inch, depending on the thickness of the cross-bar plate also described below. Immediately below this short round part, the slender bar may continue as a square bar to its pointed end, or it may be flattened on the opposite sides, in such a way that the opposite sides are parallel to each other and parallel to the plane in which the compass-legs move. This square or flattened lower part of the slender bar serves to hold accurately and securely the extension bar described below.

The ellipso-crossbar-plate 6 is of sturdy but preferably light steel or composition metal, and serves as essential guide in describing ellipses with the compass and ellipso-extension-bar 9. The thickness of this cross-bar plate 6 may vary from about one sixteenth to one eighth of an inch, and the length of the cross-bars also is proportioned to the size of the compass and the entire mechanism. This cross-bar plate is cruciform and has one lateral arm 33 formed with a track 34 which lies at right angles to the longitudinal slot 36 which extends through both of the longitudinal arms 35. The remaining lateral arm is in the form of a handle 37. The edges of the handle and of the adjacent side of the longitudinal arms are so shaped and curved that a continuous irregular curve is provided which may serve as a design for drawing irregular curves.

The handle arm also has a track 38 secured to its upper surface, and which runs from end to end along the middle thereof exactly at right angles to the slot 36 and longitudinally aligned with the first-mentioned track 34. Each track consists of two slender metal plate bars rabbeted on the inner and under surfaces secured to the top of the respective arm exactly parallel to each other, and sufficiently far apart as to permit the small shoe 25 on the compass-leg 11 to slide snugly therebetween the length of the track.

The slot 36 should be as narrow as proper manipulation of the ellipso-compass will permit, and be from one sixteenth of an inch in width upwards. The slot 36 must be perfectly smooth and accurately straight on its inner sides, so that the die 39 will describe a straight line when moving along the slot. The die 39 has a small hole 39' in its exact center and exactly at right angles to the plane 35 of the cross-bar plate. This hole must be exactly the same in diameter as the short rounded section of the slender steel bar 28 of the compass element immediately below its shoulder or flange 32, which may be one sixteenth of an inch, more or less. The die 39 is held slidably in the slot by two tiny plates 40, 41 on the upper and lower sides of the die, and beyond the sides of the die and sliding snugly on the top and bottom of the plate 35, which plates hold the die in the slot and permit the die to move as in a track from end to end of the slot 36.

Each end of the slotted cross-bar 35 terminates in a square or rectangular key-post 42, 43, extending horizontally in opposite directions and in line with the slot 36. These key-posts may be in one piece with the cross-bar plate 35, and onto them two rigid right-angled anchor points 7 and 8, with correspondingly morticed sockets 44, 45 at their ends are snugly fitted. The anchor-points 7 and 8 should be so fitted that when attached to the key-posts, a line drawn between their points will run as nearly as possible down the middle of the slot 36 in the slotted cross-bar. The slotted cross-bar plate is graduated or ruled as indicated at 46, 47 along that edge of the slot 36 which is nearest the arm 33. This rule marking is for the purpose of computing the exact length of ellipses to be drawn. An arrow point on the top of the die indicates the ruled markings, the arrow point being in line with the center of the hole in the die. For practical purposes the edges along the right angles of the cross-bar plate may also be rule marked.

The ellipso-extension-bar 9 consists of a double extension-bar 51, a bullet shaped hub 48, and the describer 49. The extension bar consists of two rigid steel parallelly spaced ribbons, each about an eighth of an inch in width, more or less, according to the size of the entire mechanism. The bullet shaped steel hub 48 is pressure conical at its upper end. Through the center of the hub is an axial bore of the same shape as the square or flattened long lower part of slender steel bar 28 attached to the compass-leg, so that the slender bar 28 fits snugly in the bore of the hub. A small set-screw 50 traverses the hub and enters the bore so as to lock the hub and the slender bar 28 together. At a point just below the conical end, the hub has two slots on opposite sides of its bore, and exactly parallel to opposite square or flattened sides of the bore in the hub. One of these slots opens through the side of the hub and has a pointer 52'. Through these slots run the bars of the double extension bar 51 very snugly. The double extension bar is also rule marked as indicated at 52 for indicating, in connection with calculations on the ruled cross-bar 35, the width and length of ellipses exactly. The rule markings on the extension bar are indicated by the pointer 52' on hub. The double extension bar 51 may be locked at any rule mark by turning the set-screw 50 against the metal ribbon 54 opposite the ruled ribbon 53 constituting the extension bar.

The outer end of the double extension bar 51 has a square or rectangular key post 55, pointing downwardly at right angles to the extension bar. To this key-post are snugly fitted the socket-like clamps 56 on upper end of the describer 49. This describer can also be extensible, in that the upper part 57 has a set-screw 58 having a burr 59, which works in the slot 58' of the scriber 60 into which the upper part telescopes, so that these parts can be adjusted for use on the compass or on the ellipso-extension bar 51. The socket clamp 56 on the upper end 57 of the scriber has a slot between the sides thereof to receive the reduced shank on the shoe when the shoe is swung to the outer side of the compass leg 11 and thereby permit slipping of the clamp over the end of the compass-leg 11. The contour of the compass-leg 11 at its end must be the same as that of the key-post on the extension bar, so that the socket-clamp of the describer will fit both. The slotted and concave scriber portion 60 of the describer can be secured in different extended positions by the set-screw 59 which firmly clamps the upper part in the concave and snugly fitting scriber. The describer can easily be slipped on or off the compass-leg or ellipso-extension bar. The lower part of the scriber ends in a socket-like clamp 61 for holding the pencil or pen 62.

Assembly and operation

*Circles.*—For describing circles the compass alone is used, by attaching the describer to the end of the leg 11 with the shoe, first having turned the shoe so that it lies flat against the side of the leg 11 and then slipping slotted clamp-socket 56 over the end of the leg, so that the steel-peg of the shoe is received in the slot in the clamp, and the clamps have a firm hold on slightly tapered end of compass-leg. The slender bar 28 on other compass leg is then brought into line with leg and locked with the latch 30. The describer is then extended to about the same length as the other leg, so that the full lengths of the legs from their pivoted ends to the point of anchor-pin and the point of the pencil are the same. The set-screw 21 is then adjusted for the size of circle to be described, and the compass then manipulated like any ordinary compass.

*Ellipses.*—For describing ellipses detach the describer from the shoe-equipped leg of the compass, and release the latch 30 on the other leg. Then slip the shoe into track either of the tracks 34 or 38 from either end of transverse arms then move the shoe to the intersection of the tracks and the slot 36. Then open the compass far enough so that the slender anchor-pin 26 can be conveniently manipulated through the hole of die 39 which slides in the slot 36. As the slender anchor-pin is pushed in, slowly slide the die away from intersection of the slots until the shoulder of anchor-pin rests on the die. Then slip the hub of the extension bars 51, frusto-conical end first, over anchor-pin from below, with describer-end of the extension bar pointing away from the said intersection and in line with slot 36. Then press the hub until it just touches against the bottom of the die, and then lock it there by turning the set-screw 50 in lower part of hub against the flat side of compass anchor-pin. Then attach the describer to the key-post at end of the extension bar, and the ellipsograph is ready for use.

The two anchor points 7 and 8 being anchored in paper on a level desk, and cross-bar plate being held level, describer is adjusted so that the pencil point 62 touches the paper, then secured with the set-screw 59. While holding the handle arm 37 with the left hand the larger knob 18 is rotated as in describing a circle, the knob being moved along in the direction in which it naturally tends when describing an ellipse. When starting an ellipse it may be best to have the pencil-point in line with the two anchor points 7 and 8 as nearly as possible. As the die is propelled along the slot 36 toward the intersection of the slots in the arms, the shoe 35 in the track moves away from the intersection. When the die reaches the intersection and is propelled towards the opposite end of the slot 36, the shoe in the track moves back toward the intersection. The actions repeat themselves in the same way on the opposite side of the slot 36 as the describing of the ellipse is completed. It is to be noted that the small shoe 25 is of such a length, that it passes through the intersection of the slots as though the slots did not intersect. A little practice enables one to describe ellipses with as much ease and facility as describing circles with an ordinary compass. It is important that all joints and fittings be accurately and snugly fitted so as to insure ease of operation and accuracy in describing circles and especially ellipses.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A compass of the type described comprising a pair of hingedly connected compass legs, spring means connected with the upper parts of said legs for normally urging the legs apart, handle means mounted on said spring means, a screw hinged to one of the legs and traversing the remaining leg, means connected to said remaining leg and engaged with the screw for adjusting the spread of the legs, an anchor pin hinged to one of the legs and swingable in a plane in which both of the legs lie, and latch means on the outer side of the last-mentioned leg and engageable with a part of said anchor for locking the anchor in longitudinal extension of the leg.

2. A compass of the type described comprising a pair of hingedly connected compass legs, spring means connected with the upper parts of said legs for normally urging the legs apart, handle means mounted on said spring means, a screw hinged to one of the legs and traversing the remaining leg, means connected to said remaining leg and engaged with the screw for adjusting the spread of the legs, an anchor pin hinged to one of the legs and swingable in a plane in which both of the legs lie, and latch means on the outer side of the last-mentioned leg and engageable with a part of said anchor for locking the anchor in longitudinal extension of the leg, and a member hingedly connected to the lower end of the remaining compass leg and swingable in the mentioned plane.

3. A compass of the type described comprising a pair of hingedly connected compass legs, spring means connected with the upper parts of said legs for normally urging the legs apart, a screw hinged to one of the legs and traversing the remaining leg, means connected to said remaining leg and engaged with the screw for adjusting the spread of the legs, an anchor pin hinged to one of the legs and swingable in a plane in which both of the legs lie, a member hingedly connected to the lower end of the remaining compass leg and swingable in the mentioned plane, and a plate having a pair of crossed slideways, the last-mentioned member being confined in one of said slideways, the remaining slideway having a die slidable therein and traversed by said anchor pin, and supports for supporting the plate above the work, and scriber means connected to said anchor pin below said plate and engaged with the work.

4. A compass of the type described comprising a pair of hingedly connected compass legs, spring means urging said legs apart, a screw hinged to one of said legs and traversing the remaining leg, means on said remaining leg and engaging said screw for adjusting the spread of said legs, an anchor pin hinged to one of said legs and swingable in the plane in which both of said legs lie, a member hingedly connected to the lower end of the remaining compass leg and swingable in the mentioned plane, a plate formed with a pair of intersecting slideways, the last mentioned member being confined in one of said slideways, a die slidable in the remaining slideway, said die being traversed by said anchor pin, and scriber means connected to said anchor pin below said plate.

GEORGE KNACKERT.